United States Patent [19]

Waddill

[11] Patent Number: 4,528,345

[45] Date of Patent: Jul. 9, 1985

[54] WEATHER-RESISTANT EPOXY COATINGS

[75] Inventor: Harold G. Waddill, Austin, Tex.

[73] Assignee: Texaco Inc., White Plains, N.Y.

[21] Appl. No.: 472,342

[22] Filed: Mar. 4, 1983

[51] Int. Cl.³ .................... C08G 59/50; C08G 59/56; C08L 63/00
[52] U.S. Cl. ..................................... 525/523; 528/407
[58] Field of Search ................ 525/523; 528/361, 407, 528/111

[56] References Cited

U.S. PATENT DOCUMENTS

| | | | |
|---|---|---|---|
| 3,336,241 | 8/1967 | Shokal | 525/507 |
| 4,081,491 | 3/1978 | Bauer | 525/510 |
| 4,115,296 | 9/1978 | Andrews | 525/523 |
| 4,115,361 | 9/1978 | Schulze et al. | 528/111 |
| 4,189,564 | 2/1980 | Waddill | 528/94 |
| 4,195,153 | 3/1980 | Waddill | 528/94 |

OTHER PUBLICATIONS

Bauer, Ronald S., Proceedings 6th Water-Borne & Higher Solids Coatings Symposium, Feb. 1979.
Bauer, Ronald S., Proceedings 9th Water-Borne and Higher Solids Coatings Symposium, Feb. 1982.
C.A. 137373d; Schreiber, Bruno, et al.; Ger. Offen. 2,228,583; 12/72.
C.A. 125518s; Schreiber, Bruno, et al.; Ger. Offen. 2,238,285; 2/73.
C.A. 141696n; Nikles, Otho L., Jr.; S. African 70-07,138, 6/71.

*Primary Examiner*—Allan M. Lieberman
*Attorney, Agent, or Firm*—Robert A. Kulason; Jack H. Park; Kenneth R. Priem

[57] ABSTRACT

A method for making weather-resistant epoxy coatings using cycloaliphatic diepoxy resins is disclosed. The method comprises pre-reacting these cycloaliphatic diepoxy resins with aminoethylpiperazine and then combining the reaction product with a curing amount of polyoxyalkylene polyamine and an accelerator.

4 Claims, No Drawings

WEATHER-RESISTANT EPOXY COATINGS

BACKGROUND OF THE INVENTION

1. Field of the Invention

This invention pertains to the field of weather-resistant epoxy coatings.

2. Description of the Related Art

Cycloaliphatic epoxy resins prepared by hydrogenation of glycidyl ethers of Bisphenol A or other di- or polyphenols may be reacted with selected curatives to form coatings that are resistant to UV degradation. Cycloaliphatic epoxy resins are prepared by the process described in U.S. Pat. No. 3,336,241. These resins are much less reactive with conventional epoxy curatives than are the phenolic-based glycidyl ethers. In a paper, Bauer, R. S., *Proceedings Ninth Water-Borne and Higher Solids Coatings Symposium*, Feb. 1982, New Orleans, pg 208, a method is described for curing these cycloaliphatic epoxy resins with specially prepared saturated polyamides. These curatives require an induction or pre-reaction period of about one hour prior to application of the coating system. Failure to pre-react the resin with the polyamide curative led to rapid loss of gloss and surface defects of the coating such as blushing and blemishing.

It has been learned that this induction period may be eliminated through use of JEFFAMINE ® polyoxyalkylene amines. The tendency for these products to blush on curing is lowered (Waddill, H. G., and Sellstrom, K. B., *Decorative Epoxy Coatings Cured with Polyetheramines*, Epoxy Resin Formulators Meeting, May 1982, Boston, MA). However, curing of the cycloaliphatic epoxy resins with polyoxyalkylene amines is quite sluggish and requires a prohibitively lengthy curing period.

My invention is a method for curing these cycloaliphatic epoxy resins which is superior to the prior art described above.

SUMMARY OF THE INVENTION

The invention is a method for making weather-resistant epoxy coatings comprising reacting aminoethylpiperazine or a mixture of aminoethylpiperazine and a polyoxyalkylene polyamine with a cycloaliphatic diepoxy resin and then combining the reaction product obtained with a polyoxyalkylene polyamine to effect curing.

DETAILED DESCRIPTION OF THE INVENTION

According to one embodiment of the instant invention, aminoethylpiperazine is combined with a cycloaliphatic epoxy resin so as to effect near complete reaction of the primary amine groups of the aminoethylpiperazine with the cycloaliphatic epoxy resin. The reaction product is then combined with another polyoxyalkylene polyamine, especially one chosen from those tradenamed JEFFAMINE ® (described hereinafter). An accelerator may also be added to facilitate the curing process.

In another embodiment of my invention, a mixture of aminoethylpiperazine and a polyoxyalkylene polyamine, especially the one tradenamed JEFFAMINE ®, can be used for pre-reaction with the cycloaliphatic epoxy resin.

The cycloaliphatic epoxy resins useful in the method of my invention are those, for example, which are made by the process disclosed in U.S. Pat. No. 3,336,241. Preferred cycloaliphatic epoxy resins are the hydrogenated glycidyl ethers of 2,2-bis(4-hydroxyphenyl)propane which is then called 2,2-bis(4-hydroxycyclohexyl)propane. Other cycloaliphatic epoxy resins such as those described in U.S. Pat. No. 3,336,241 may also be used by those skilled in the art using the invention described herein to effect weather-resistant epoxy coatings which are non-blushing.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

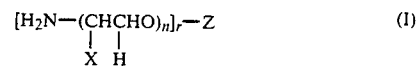

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylene polyamines are the polyoxypropylene diamines wherein X is a methyl radical, n is a number from 1 to 10, Z is a 1,2-propylene radical and r is about 2. These polyoxyalkylene polyamines can be prepared by known methods as disclosed in U.S. Pat. No. 3,236,895 and U.S. Pat. No. 3,654,370. The most preferred polyoxyalkylene polyamines are a polyoxypropylene diamine having a molecular weight of about 230 or a triamine of molecular weight about 400. These products are available under JEFFAMINE ® D-230 and JEFFAMINE T-403 from Texaco Chemical Company. Their use as curing agents is decribed, for example, in U.S. Pat. No. 4,189,564.

Aminoethylpiperazine, which has the structure

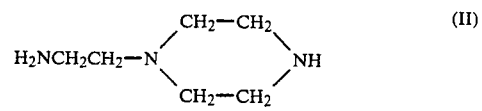

is the preferred primary amine for pre-reaction with the cycloaliphatic epoxy resin.

The reaction between aminoethylpiperazine or aminoethylpiperazine and a polyoxyalkylene polyamine and the cycloaliphatic diepoxy resin will take place at room temperature up to about 150° C. Preferably, a temperature of 80° to 125° C. is used to obtain a convenient reaction rate. The process may be atmospheric but an inert gas pad, for example nitrogen, is desirable to avoid extraneous reactions.

The amount of aminoethylpiperazine or mixture of aminoethylpiperazine and polyoxyalkylene polyamine to be reacted with the cycloaliphatic diepoxy resin is that amount which will ensure a maximum level of primary amine reaction but give a reaction product which is not too viscous to handle. The greater the ratio of aminoethylpiperazine or mixture of aminoethylpiperazine and polyoxyalkylene polyamine to epoxy resin the less primary amine is reacted. However, a large excess of epoxy resin will result in a very viscous product or even a gel, which is undesirable. For example, two moles of aminoethylpiperazine should react with one mole of the diepoxy resin. However, due to extraneous reaction more aminoethylpiperazine is usually desirable.

It is imperative for the process of my invention that the aminoethylpiperazine or a mixture of aminoethylpiperazine and polyoxyalkylene polyamine be reacted first with the epoxy resin before the curing step. The reaction product of aminoethylpiperazine or a mixture of aminoethylpiperazine and polyoxyalkylene polyamine and the epoxy resin is stable and can be stored and/or transported before being used (aminoethylpiperazine is disclosed as a component of an accelerator in U.S. Pat. Nos. 4,189,564 and 4,195,153).

Other reactive amines that might be used to form adducts; for exaple, triethylenetetramine, contain a higher equivalent amount of primary amine. These amines would then require reaction with larger amounts of epoxy resin for neutralization of the primary amine function. Attempts to react completely or nearly so all of the primary amine groups of such an amine generally leads to the formation of a highly viscous or partially crosslinked adduct which either cannot be dissolved in the curative system or which creates a very viscous unmanageable curative. Therefore, these types of higher amines are not preferred in this invention.

In the second step of the method of my invention, the adduct of the primary amine; for example, aminoethylpiperazine with the cycloaliphatic epoxy resins are combined with a curing amount of a polyoxyalkylene polyamine defined above. It is desired to have present a small amount of an accelerator which necessarily contributes little or no yellowing during the weathering process. For example, imidazoles or their derivatives are useful as accelerators. It is within the skill of the art to select a suitable accelerator.

The following examples illustrate my invention but are not intended to limit the scope of the invention.

EXAMPLE I

Preparation of Aliphatic Amine Adduct

| Preparation of Aliphatic Amine Adduct | |
|---|---|
| Reactants | |
| Saturated cycloaliphatic epoxy resin[1] | 100 pbw |
| N—aminoethylpiperazine (AEP) | 100 pbw |

[1]EPONEX 1510 resin; a product of Shell Chemical Co.

N-aminoethylpiperazine was placed in a flask equipped with stirrer, thermometer, $N_2$ inlet, overhead cold water condenser and dropping funnel. The amine was heated under nitrogen to ~80° C. Epoxy resin was added slowly while maintaining a reaction temperature of 80°–100° C. After addition of resin was completed, the temperature was raised to 110° C. for two hours while stirring vigorously under a nitrogen atmosphere.

Adducts of this type, since they are quite viscous, cannot be used in coating systems without dilution with a solvent. In systems of this invention the adducts are normally dissolved into a polyether polyamine (JEFFAMINE product) for the purpose of accelerating curing of the epoxy-polyether polyamine system. Such blends may be composed as follows:

| Component | A | B |
|---|---|---|
| Polyoxypropylenediamine[2] | 25 | — |
| Polyoxypropylenetriamine[3] | — | 26 |
| Saturated epoxy resin AEP adduct[4] | 10 | 10 |

[2]JEFFAMINE D-230; a product of Texaco Chemical Co.
[3]JEFFAMINE T-403; a product of Texaco Chemical Co.
[4]Product prepared as described in Example I, above.

EXAMPLE II

Properties of Curing Systems in Coatings Applications

| | A | B | C | D |
|---|---|---|---|---|
| Formulation | | | | |
| Saturated epoxy resin[1] | 100 | 100 | 100 | 100 |
| Resin[1] AEP adduct (1 · 1 pbw) | — | 10 | — | — |
| Resin TETA adduct[2] (1 · 1 pbw) | — | — | 5 | — |
| Resin MIBPA adduct[3] (1 · 1 pbw) | — | — | — | 10 |
| Polyoxypropylenetriamine[4] | 33 | 26 | 26 | 22 |
| Accelerator[5] | 5 | 5 | 5 | 5 |
| Coating Properties | | | | |
| Drying time, 6-mil film | | | | |
| Set-to-touch, hours | 16.0 | 7.6 | 8.9 | 4.7 |
| Surface-dry, hours | 20.8 | 10.5 | 13.8 | 6.8 |
| Through-dry, hours | 23.8 | 12.8 | 15.8 | 10.8 |
| Pencil hardness after 7 days, ~25° C. | B–HB | F | F | F |
| Yellowing index (YI), initial | — | 9.0 | 7.7 | 8.7 |
| after 1,000 hrs exposure[6] | — | 11.6 | 11.0 | 11.1 |
| Gloss, 60°, initial | — | 94.7 | 87.2 | 73.1 |
| after 1,000 hrs exposure[6] | — | 91.6 | 78.5 | 67.5 |

[1]EPONEX 1510; Shell Chemical Co. Epoxy equivalent weight ~235
[2]TETA = triethylenetetramine: $H_2NCH_2CH_2NHCH_2CH_2NHCH_2CH_2NH_2$
[3]MIBPA = methyl iminobispropylamine: $H_2NCH_2CH_2CH_2N(CH_3)CH_2CH_2CH_2NH_2$
[4]JEFFAMINE T-403
[5]Imidazole
[6]Clear coating (6–8 mil thickness) on white ceramic tile. Weatherometer cycle-continuous light (Xenon arc), no water spray.

Data of table indicates that use of each adduct resulted in rapid curing of the coating system, clearly an improvement over curing with polyoxypropylenetriamine and accelerator alone. A harder surfaced coating was also produced more rapidly with addition of the adducts. The system incorporating an aminoethylpiperazine adduct was the only formulation, however, to maintain surface gloss through a lengthy period of simulated outdoor weathering. Adducts prepared from other active amines produced coatings which became dull and lusterless after Weatherometer exposure.

I claim:

1. A method for making weather-resistant epoxy coatings comprising
    (a) reacting aminoethylpiperazine with a cycloaliphatic diepoxy resin at room temperature to about 150° C. wherein the amount of aminoethylpiperazine reacted is the amount which will ensure a maximum level of primary amine reaction but give a reaction product which is not too viscous to handle and then
    (b) combining the reaction product of (a) with a curing amount of polyoxyalkylene polyamine and an accelerator which contributes little or no yellowing during the weathering process.

2. A method as in claim 1 wherein the reaction in (a) takes place at from about 80° C. to 125° C.

3. A method as in claim 1 wherein the polyoxyalkylene polyamine is a triamine of about 400 molecular weight.

4. A method as in claim 1 wherein the polyoxyalkylene polyamine is a diamine of about 230 molecular weight.

* * * * *